United States Patent
Snover et al.

(10) Patent No.: US 10,606,569 B2
(45) Date of Patent: Mar. 31, 2020

(54) DECLARATIVE CONFIGURATION ELEMENTS

(71) Applicant: Microsoft Technology Licensing, LLC, Redmond, WA (US)

(72) Inventors: Jeffrey P. Snover, Woodinville, WA (US); Bruce G. Payette, Bellevue, WA (US); Kenneth M. Hansen, Woodinville, WA (US); Narayanan Lakshmanan, Bothell, WA (US); Xiaoyong Zhou, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/921,108

(22) Filed: Jun. 18, 2013

(65) Prior Publication Data

US 2014/0359258 A1 Dec. 4, 2014

Related U.S. Application Data (60) Provisional application No. 61/830,125, filed on Jun. 2, 2013.

(51) Int. Cl.
*G06F 8/41* (2018.01)
*G06F 9/445* (2018.01)
(Continued)

(52) U.S. Cl.
CPC .............. *G06F 8/423* (2013.01); *G06F 9/448* (2018.02); *G06F 9/4488* (2018.02);
(Continued)

(58) Field of Classification Search
CPC .......... G06F 8/20; G06F 9/45512; G06F 8/51; G06F 8/41; G06F 8/76; G06F 8/61;
(Continued)

(56) References Cited

U.S. PATENT DOCUMENTS 6,269,473 B1 * 7/2001 Freed et al. .................. 717/104
6,785,706 B1 * 8/2004 Horman ........................ 709/203
(Continued)

FOREIGN PATENT DOCUMENTS

CN 101689112 A 3/2010
WO 2008130769 A2 10/2008

OTHER PUBLICATIONS

Delaet, Thomas et al. "A Survey of System Configuration Tools." 2010. LISA.*

(Continued)

*Primary Examiner* — Lewis A Bullock, Jr.
*Assistant Examiner* — Gilles R Kepnang
(74) *Attorney, Agent, or Firm* — Workman Nydegger (57) ABSTRACT

Systems and methods for desired state configuration (DSC) are disclosed. DSC provides the ability to perform declarative configuration natively within a shell language and to use early-bound schematized data constructs embedded in a late-bound shell language. This allows declarative programming elements to be incorporated into imperative languages, such as scripts for configuration management. Script may combine the power of an imperative shell language with the ease of use of a declarative language and may use both imperative and declarative syntax in the same language.

20 Claims, 6 Drawing Sheets

(51) Int. Cl.
  *G06F 9/448* (2018.01)
  *G06F 8/60* (2018.01)
  *G06F 8/61* (2018.01)
(52) U.S. Cl.
  CPC ............ *G06F 9/44505* (2013.01); *G06F 8/60* (2013.01); *G06F 8/61* (2013.01)
(58) Field of Classification Search
  CPC ... G06F 9/548; G06F 8/65; G06F 8/38; H04L 12/433
  USPC .......... 709/203; 713/166; 717/109, 117, 125
  See application file for complete search history.

(56) References Cited

U.S. PATENT DOCUMENTS

| | | | | |
|---|---|---|---|---|
| 7,065,744 | B2* | 6/2006 | Barker et al. .................. | 717/109 |
| 7,949,991 | B1* | 5/2011 | Kuwamoto ........... | G06F 9/4498 717/100 |
| 8,255,932 | B1* | 8/2012 | Clemm ..................... | G06F 8/54 709/230 |
| 8,825,990 | B2* | 9/2014 | Tukol et al. ........................ | 713/1 |
| 9,049,044 | B1* | 6/2015 | Marshall ............... | H04L 12/433 |
| 2002/0087734 | A1* | 7/2002 | Marshall et al. ............. | 709/310 |
| 2004/0088688 | A1* | 5/2004 | Hejlsberg ................... | G06F 8/51 717/143 |
| 2005/0091635 | A1* | 4/2005 | McCollum ................ | G06F 8/20 717/101 |
| 2005/0278708 | A1* | 12/2005 | Zhao ......................... | G06F 8/20 717/136 |
| 2005/0289522 | A1* | 12/2005 | Chang ...................... | G06F 8/20 717/140 |
| 2006/0080656 | A1* | 4/2006 | Cain ......................... | G06F 8/65 717/174 |
| 2006/0184794 | A1* | 8/2006 | Desselle et al. .............. | 713/166 |
| 2006/0271911 | A1* | 11/2006 | Palapudi ................. | G06F 9/548 717/106 |
| 2007/0256055 | A1* | 11/2007 | Herscu .......................... | 717/115 |
| 2007/0260629 | A1* | 11/2007 | Tseitlin .................... | G06F 8/20 |
| 2008/0320444 | A1 | 12/2008 | Meijer et al. | |
| 2009/0150854 | A1* | 6/2009 | Elaasar ...................... | G06F 8/10 717/104 |
| 2009/0158262 | A1* | 6/2009 | Novoselsky .............. | G06F 8/41 717/154 |
| 2009/0187886 | A1* | 7/2009 | Peck ......................... | G06F 8/38 717/117 |
| 2009/0216869 | A1 | 8/2009 | Kennedy | |
| 2009/0240935 | A1* | 9/2009 | Shukla ................ | G06F 9/44505 713/100 |
| 2009/0254881 | A1* | 10/2009 | Johnson et al. ............. | 717/117 |
| 2010/0083287 | A1* | 4/2010 | Maximilien .............. | G06F 8/31 719/328 |
| 2010/0095272 | A1* | 4/2010 | Shukla ................ | G06F 9/45512 717/117 |
| 2010/0100868 | A1* | 4/2010 | Shukla et al. ................ | 717/109 |
| 2011/0276951 | A1* | 11/2011 | Jain .................... | G06F 11/3006 717/140 |
| 2012/0240135 | A1* | 9/2012 | Risbood .................... | G06F 8/61 719/328 |
| 2012/0260238 | A1 | 10/2012 | Cheriton | |
| 2013/0019229 | A1* | 1/2013 | Bohlmann et al. ........... | 717/139 |
| 2013/0159981 | A1* | 6/2013 | Klemenz ................ | G06F 8/427 717/143 |
| 2014/0013415 | A1* | 1/2014 | Sabetta ................... | G06F 21/57 726/16 |
| 2014/0229919 | A1* | 8/2014 | Spiridonov et al. .......... | 717/125 |

OTHER PUBLICATIONS

Herry, Herry et al. "Automated Planning for Configuration Changes." 2011. LISA.*
"International Search Report & Written Opinion for PCT Application No. PCT/US2014/039876", dated Oct. 20, 2014, 14 Pages.
Schildt, Herbert, "Chapter 17: Virtual Functions and Polymorphism", In the Complete Reference—Fourth Edition, 2003, pp. 443-458.
Hedin, et al., "The JastAdd System Combining Declarative and Imperative Compiler Implementation", Published on: Aug. 31, 2001, Available at: http://citeseerx.ist.psu.edu/viewdoc/download?doi=10.1.1.105.8245&rep=rep1&type=pdf.
Gorp, et al., "Integrating a Declarative with an Imperative Model Transformation Language", In Technical Report Dec. 2006, Sep. 2006, 34 pages.
Jouault, et al., "Transforming Models with ATL", In MoDELS Satellite Events, Oct. 2, 2005, 11 pages.
Brunet, et al., "COP: A Simple Way to Integrate Imperative Programming and Declarative Programming", In Canadian Conference on Electrical and Computer Engineering, vol. 2, Sep. 5, 1995, 4 pages.
Grabmäuller, Martin, "The Constraint Imperative Programming Language Turtle", In Workshop der GI-Fachgruppe, vol. 2, Issue 4, Retrieved on: Jun. 3, 2013, 7 pages.
Fichera, et al., "A Methodology to Extend Imperative Languages with AgentSpeak Declarative Constructs", In Proceedings of the 11th WOA Workshop, Sep. 5, 2010, 9 pages.
Apt, et al., "Alma-0: An Imperative Language that Supports Declarative Programming", In ACM Transactions on Programming Languages and Systems, vol. 20, Issue 5, Sep. 1998, 53 pages.
"NCD Scripting Language", Published on: Mar. 27, 2013, Available at: https://code.google.com/p/badvpn/wiki/NCD.
Soares, et al., "Relating Declarative Hypermedia Objects and Imperative Objects through the NCL Glue Language", In Proceedings of the 9th ACM Symposium on Document Engineering, Sep. 16, 2009, 10 pages.
European Patent Office, "Written Opinion of the International Preliminary Examining Authority, Issued in PCT Application No. PCT/US2014/039876", dated Aug. 6, 2015, 9 Pages.
"Office Action", issued in European Patent Application No. 14733864.4, dated Sep. 20, 2016, 5 Pages.
European Patent Office, "Notification of Transmittal of the International Preliminary Report on Patentability, issued in PCT Patent Application No. PCT/US2014/039876", dated Oct. 29, 2015, 12 Pages.
"First Office Action and Search Report Issued in Chinese Patent Application No. 201480043678.6", dated Mar. 5, 2018, 13 Pages.
"CINT the C++ Interpreter", Retrieved From: https://root.cern.ch/root/html534/guides/users-guide/CINT.html, Retrieved Date: Sep. 14, 2018, 28 pages.
"Decision to Refuse Issued in European Patent Application No. 14733864.4", dated Jun. 19, 2017, 8 Pages.
"Summons to Attend Oral Proceedings Issued in European Patent Application No. 14733864.4", Mailed Date: Dec. 6, 2016, 5 Pages.
"Summons to Attend Oral Proceedings Issued in European Patent Application No. 14733864.4", Mailed Date: Sep. 19, 2018, 12 Pages.
"Second Office Action Issued in Chinese Patent Application No. 201480043678.6", dated Nov. 20, 2018, 9 Pages.
"Third Office Action Issued in Chinese Patent Application No. 201480043678.6", dated Jun. 17, 2019, 10 Pages.

* cited by examiner

202 ──── configuration WebApp
         {
            param(
               [switch]
               $IncludeTelnetClient,

[string[]]
               $Files,

[Credential()]
               $Credential
            )

# imperative construct for selection
            node $ConfigData.Where('Role -eq WebSite')
            {
               # declarative construct
               # Role is a dynamic keyword with some properties
               Role IIS
               {
                  Name="Web-Server"
                  Ensure="Present"
               } conditional checks
               if ($IncludeTelnetClient)
               {
                  Role TelnetClient
                  {
                     Name="Telnet-Client"
                     Ensure="Present"
                  }
               }

# iterative loops
               foreach($file in $Files)
               {
                  File "File_$file"
                  {
                     DestinationPath="C:\Configuration"
                     SourcePath="\\CompanyShare\MyShare\Configuration\$file"
                     Credential = $global:CredentialToUse
                  }
               }
            }
         }

DECLARATIVE CONFIGURATION ELEMENTS

CROSS-REFERENCE TO RELATED APPLICATIONS

This application claims the benefit of the filing date of U.S. Provisional Patent Application No. 61/830,125, which is titled "Declarative Configuration Elements" and was filed on Jun. 2, 2013, the disclosure of which is hereby incorporated by reference herein in its entirety.

BACKGROUND

Imperative programming languages require users to define a sequence of specific commands that a machine should perform to achieve a desired result. In contrast, declarative programming languages allow users to define the end result that a program should accomplish without describing the specific actions to be taken. A declarative program describes a desired result without explicitly listing steps to be performed by the machine.

When performing a repetitive task, such as configuring a large number of servers in a distributed or cloud-computing environment, it is helpful to automate such tasks. When using imperative scripting languages for automation, all of the actions required to accomplish the task must be included in the program for each different scenario that may be encountered to ensure that the task will be completed. As a result, using scripting languages for automation can be an error-prone process because the user must verify that the desired result was accomplished (e.g., check error codes) each time the task was executed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Desired State Configuration (DSC) as described herein provides the ability to perform declarative configuration natively within a shell language and to use early-bound schematized data constructs embedded in a late-bound shell language. This allows declarative programming elements to be incorporated into imperative languages, such as Windows PowerShell® or other operating system shells, as well as scripting languages such as Ruby and Python. Script authors may then combine the power of an imperative shell language with the ease of use of a declarative language and may use both imperative and declarative syntax in the same language.

One embodiment provides the ability to combine the power of imperative language with the ease of use of declarative language in a single language. DSC enables users to ensure that components of a data center or other deployment have the correct configuration. DSC provides a set of language extensions and providers that enable declarative, autonomous, and repeatable deployment, configuration, and conformance of standards-based managed elements. DSC enables a developer or other user to define an exact configuration of target nodes (e.g., computers, machines, or other devices) and to enable a continuous deployment without configuration drift.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In one embodiment, a management automation language or shell language, such as Windows PowerShell®, Ruby, or Python, supports declarative syntax by making generic changes to the shell parser and making certain specific additions to support declarative syntax and structured, schematized data. For example, the following changes may be made to the shell parser:

Change the parser to support dynamic keywords (i.e., introduce new tokens to the shell parser, which it then identifies as a keyword). This is done by defining a new DynamicKeyword class.

The DynamicKeyword class also defines the list of Properties that are available for the keyword.

The syntax supported by dynamic keywords will be limited to a fixed set of forms:

Script block

Attribute/value pairs

A dynamic keyword maps to a function within the same module where the dynamic keyword is defined. At execution time, this function will be invoked.

On the other hand, declarative programming languages allow a user to model a system as a set of resources. A declarative program allows a user to direct a machine to create certain resources without knowing or reciting specific steps that will be needed ahead of time. This allows the machine to determine what action is required each time the task is run.

Users may be required to use a particular configuration, shell, or domain-specific programming language when writing scripts for a selected operating system. If the shell is an imperative language, then the user would be unable to use declarative programming concepts for that operating system. It would be useful to incorporate declarative programming capabilities into existing imperative language shells. There are existing configuration or shell languages that are purely declarative. In some cases, these languages add support for imperative syntax but do so only by supporting another language. Accordingly, existing solutions require authors using those configuration systems to use two different languages.

Binding differences between these languages also prevent the merging of the imperative and declarative concepts in existing configuration management systems. A shell is typically late-bound, wherein types are not known until runtime. On the other hand, schema-based declarative languages are early-bound, wherein types are known at compile time. The differences in binding make it difficult to blend early-bound and late-bound languages. Embodiments also add early-bound language to a late-bound or dynamic language to construct schematized data. By unifying these concepts, a model is created that understands configuration management while maintaining support for the host language.

The schema identifies which properties are (or are not) required, the properties' names, etc. This is in contrast to a normal command invocation in a dynamic language wherein such errors would not be identified until execution. Consequently, command invocation for dynamic languages requires a lot of testing to verify operation at runtime.

Early-bound concepts may be added to a late-bound language in one embodiment by defining a new keyword that creates a specified region and allows users to define a programming artifact within that region that acts as a function that produces data. Within the domain of the defined region, the program can import resource models that introduce the new keywords, wherein the keywords are scoped to that region. This allows different sets of keywords to be imported into different areas of the same file. Each keyword is scoped to a specific region of the file.

Figure 1:
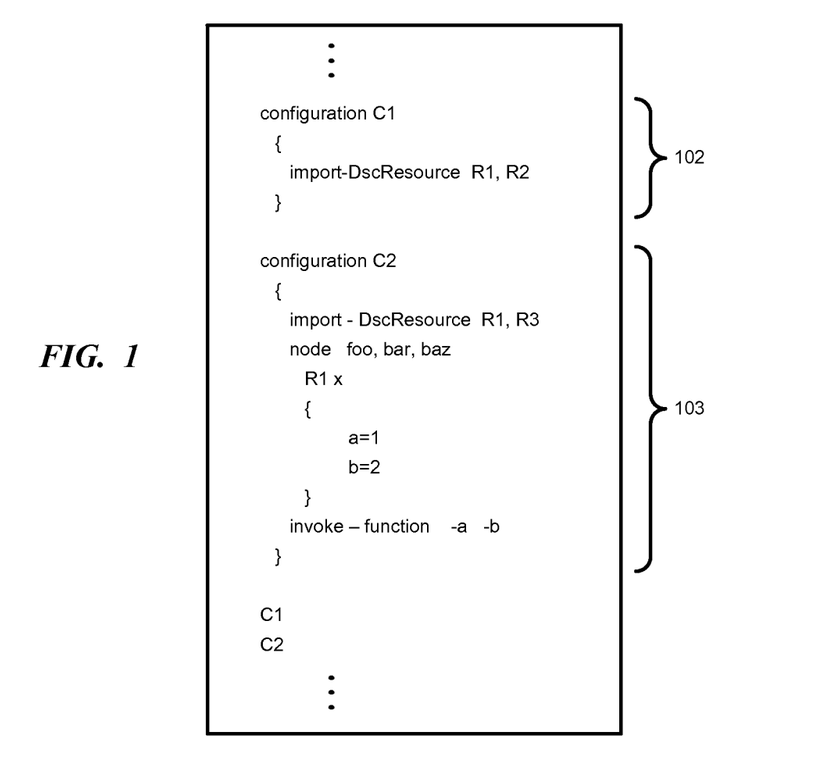
FIG. 1 illustrates code having configuration scripts that incorporate an example embodiment.

FIG. 1 illustrates code 101 having configuration scripts 102 and 103, which incorporate an example embodiment. Scripts 102 and 103 import custom resource modules for a set of machines to be configured using these scripts. The "configuration" keyword indicates that the file is in the configuration region and configuration extensions apply. It will be understood that "configuration" is merely one non-limiting example of a dynamic keyword.

A base set of resources are loaded by the configuration manager automatically. In addition, using the dynamic keywords, a script can import a set of custom modules for a set of machines to be configured. Resource modules R1, R2, and R3 in the example of FIG. 1 build on and leverage resources in the existing shell mechanism.

Script 102 defines specific types of resources—R1 and R2—to be used in the region of configuration C1. This configuration may span multiple machines.

Script 103 defines configuration region C2, which imports a different group of resources—R1 and R3. Script 103 goes on to construct three nodes named "foo," "bar," and "baz." On these nodes, script 103 then creates an instance of resource R1 called "x" and sets properties "a" and "b" to values 1 and 2, respectively.

Scripts 102 and 103 define common bits of configuration that can be used as a resource in the other parts of the code. These configurations can then be reused without requiring the configuration steps to be rewritten each time. The configurations are defined using dynamic keywords that are valid only for specific regions.

Writing the resource in this way provides a means for error checking while generating the scripts. For example, if property "a" did not exist in resource R1, then the script editor would generate an error in line 7 of script 103. This is because the editor would have the full schema for resource R1 and would know ahead of time that property "a" was not in the schema.

In script 101, the word "configuration" is a new dynamic keyword that is used to define regions. The keywords and properties in each configuration are unique within the scope of that region. For example, the keyword "node" is new to region C2 103 and is valid only in that region (i.e., "node" is not valid in the region C1). The keyword "configuration" as used in FIG. 1 is an example of late-binding; however, unlike typical imperative languages, early-binding also occurs in this example because the script is validated within the scope of each new region (e.g. validate that properties "a" and "b" in region C2 are present and should be numbers).

Each resource is restricted to the scope of its configuration and is not available outside of this configuration region. This allows different resources or different versions of resources to be used in different configurations. For example, resource R2 (region C1) may be used to configure Web server application X, and resource R3 (region C2) may be used to configure Web server application Y. These applications are only available within their respective configuration regions. Accordingly, machines with configuration extension C1 (and consequently with resource R2) are loaded with Web server application X, while machines with configuration extension C2 (and thereby having resource R3) are loaded with Web server application Y.

The applications X and Y may be competing products, such as Web servers from different companies, for example. Machines that require application X are created with configuration C1, and machines that require application Y are created with configuration C2. Alternatively, applications A and B may be different versions of the same application. This allows users to configure machines with different versions, as needed, depending upon the type of operating system, database, file system, processor, services, etc. being used.

Figure 2:
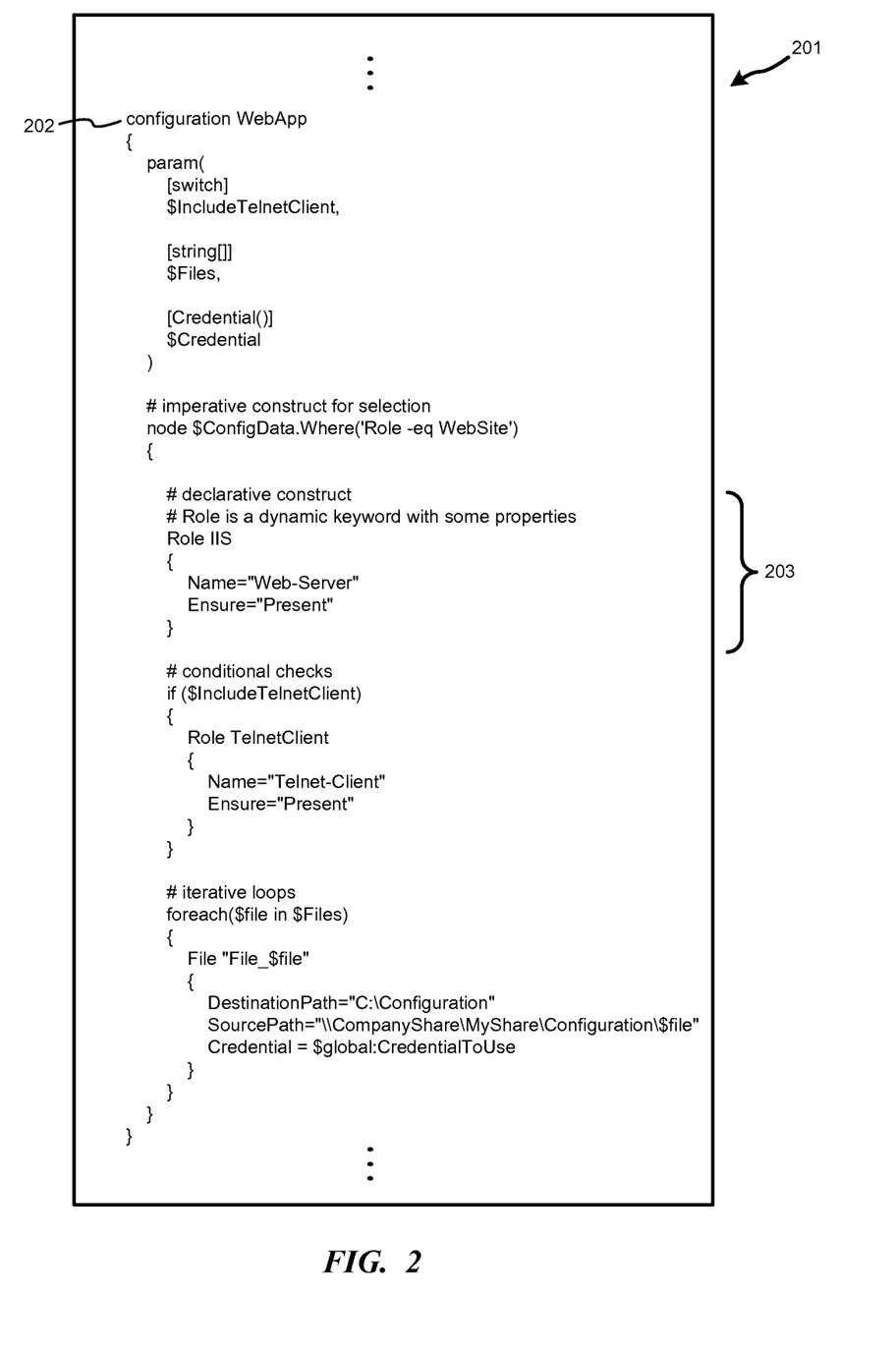
FIG. 2 illustrates script that combines imperative and declarative elements.

FIG. 2 illustrates script 201 that combines imperative and declarative elements. Script 201 uses the dynamic keyword "configuration" to define a resource named "WebApp" 202. This resource includes a declarative construct "Role" 203 with properties "Name" and "Ensure." The properties will be valid within the region of this resource.

Figure 3:
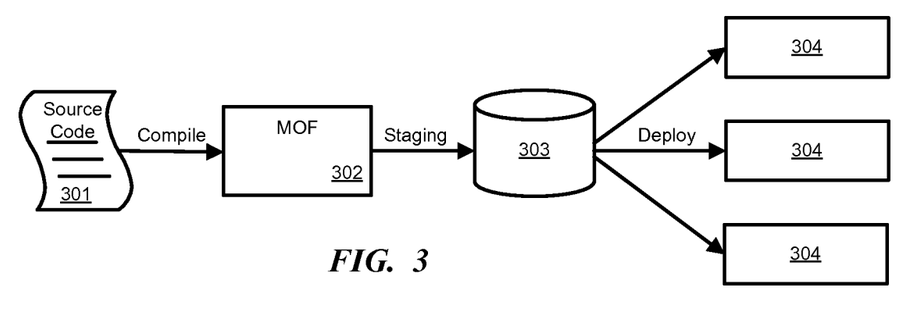
FIG. 3 is a block diagram illustrating deployment of source code to nodes according to one embodiment.

FIG. 3 is a block diagram illustrating deployment of DSC source code to nodes. A developer creates source code 301 using any appropriate editor, developer workstation, or configuration manager. Source code 301 may include imperative as well as declarative code. The source code may be a script for a shell language or any other code that includes both imperative and declarative elements. In one embodiment, the editor provides declarative syntax extensions, schema-driven intelligent code sense, schema validation, and early binding. The source code 301 is compiled into a machine-readable managed object format (MOF) file 302. Other formats may be used for intermediate file 302 in other embodiments.

MOF 302 is then staged to a staging area 303 before being deployed (e.g., via push or pull) to nodes 304. MOF 302 is a fully declarative configuration representation. Using MOF 302, the configuration for all nodes can be calculated in staging area 303. The declarative configuration is reified or deployed to nodes 304 through imperative providers.

The MOF document contains desired state information for one or more resources. In one embodiment, source code information is included in the MOF document, which would allow errors identified in the MOF document to be associated with specific instructions in the source code. For example, a symbol table may be embedded in the MOF document.

Staging area 303 is an intermediate representation in which the model is visible so that users may perform additional reasoning and analysis. Any proprietary or third-party tool can be used in staging area 303 to check the MOF file. Configuration errors may be identified in the staging phase, such as memory size issues or security problems, before deployment. For example, the user may do pre-deployment validation of the code against a set of rules in the staging area 303.

In existing systems, validation tools are run after code has been deployed to nodes. When there is a deployment to many nodes, each node must be tested and configuration errors repaired on each of the nodes. Embodiments described herein avoid this problem by allowing testing before the code reaches the nodes. In this way, staging area 303 minimizes the risk of deploying a problematic configuration. Additionally, staging area 303 supports scalability by allowing identification and correction of configuration errors before deployment across many distributed nodes 304.

Figure 4:
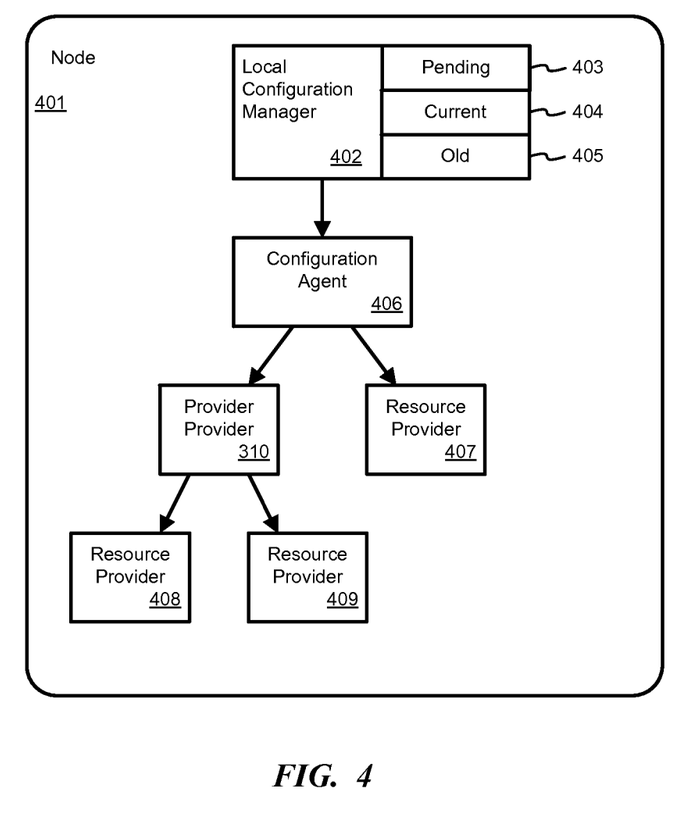
FIG. 4 is a block diagram illustrating components used in deploying a MOF model to a target node according to one embodiment.

FIG. 4 is a block diagram illustrating components used in deploying the MOF model to a target node 401 according to one embodiment. Local configuration manager 402 on node 401 either pulls the MOF file from the staging area or receives a MOF pushed by the staging area. Local configuration manager 402 coordinates reception and application of resource states on node 401. Local configuration manager 402 includes a three-stage repository for storing the MOF document. When the MOF arrives and before it has been applied to the node, the MOF document is loaded in pending repository 403. After local configuration manager 402 has applied the model to node 401, the currently applied MOF document is moved to current repository 404. If a new model is applied, then one or more previous MOF documents stored to old repository 405.

Local configuration manager 402 instructs a configuration agent 406 to apply the pending MOF document to the system. When a MOF model is applied, it is promoted from pending repository 403 to current repository 404. The prior document is then moved to old repository 405. This allows the node to maintain a record of all pending, current, and previous configurations. This history of configurations provides the capability to track-back and determine who generated a configuration, when a configuration was applied, which machines received a configuration, etc.

The MOF models the aspects of the system that need to be configured, such as roles that need to be installed, applications that need to be installed, registry keys, etc. Configuration agent 406 coordinates configuration of resources. Configuration agent 406 reads the MOF configuration document, performs parsing and dispatch, orders resources by dependency, and executes the resources. Each resource has a schema or contract (e.g, a MOF class). Individual resource providers 407-409 take an instance of the specified document and do whatever is needed to enact a designated state for the machine. Each resource provider 407-409 is adapted to process the configuration for a single resource on node 401.

Configuration agent 406 may interact with the resource providers directly, such as provider 407. In other embodiments, configuration agent 406 interacts with a provider-provider 410 (e.g., for implementing a third-party provider) that creates the required resource providers 408, 409. Provider-provider 410 masks the details of the resource provider classes so that configuration agent 406 does not need to understand how to configure the resource. Node 401 is partitioned into layers (e.g., local configuration manager 402, configuration agent, 406, provider-providers 410, and resource providers 407-409) and, in one embodiment, uses well-defined standardized interfaces between the layers. This configuration allows for maximum flexibility with minimum complexity. Using the standardized interfaces, third parties can create provider-providers 410 and resource providers 407-409 in any appropriate language as long as they comply with the expected interface to other components.

In one embodiment, the interfaces are defined in a standards-based way using MOF, and the interfaces are also represented in a standardize way using MOF, which allows both schema and interfaces to be defined in the same language. This maximized extensibility while minimizing complexity by using well-defined interfaces between the layers on the node.

Figure 5:
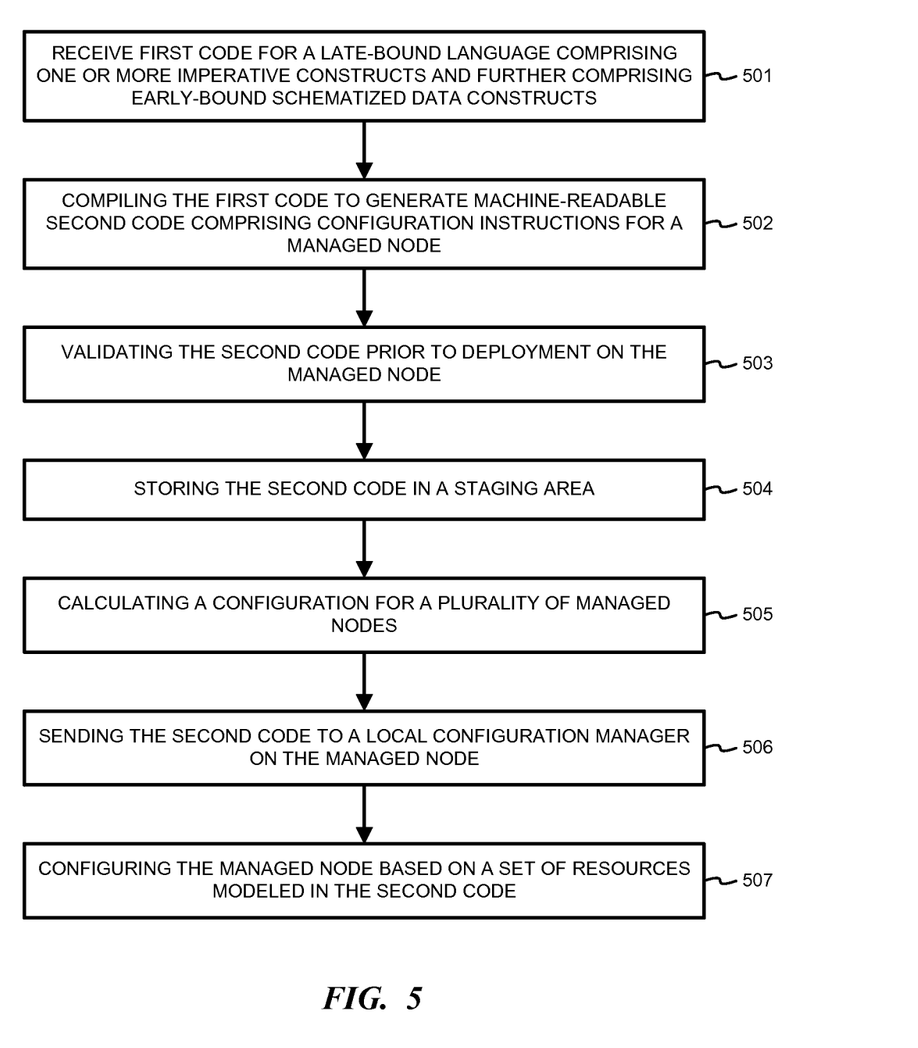
FIG. 5 is a flowchart illustrating a process or method for supporting declarative syntax in a management automation language or shell language.

FIG. 5 is a flowchart illustrating a process or method for supporting declarative syntax in a management automation language or shell language, such as Windows PowerShell®, Ruby, or Python. In step 501, first code written for a late-bound language is received. The first code comprises one or more imperative constructs, the first code further comprising one or more declarative constructs defining early-bound schematized data constructs. The declarative constructs in the first code define resources that are valid for a designated region of the first code.

The first code may be written in a management automation language or a shell language. The declarative constructs may define a set of resource definitions for a specific configuration context. The declarative constructs may be included in the first code using dynamic keywords, wherein dynamic keyword define resources and properties that are available within a configuration region.

In step 502, the first code is compiled to generate machine-readable second code that comprises configuration instructions for a managed node.

The second code defines a desired state for one or more resources on the managed node. The second code may be a managed object format (MOF) file.

In step 503, the second code is validated prior to deployment on the managed node. The second code may be validated against a set of rules to identify configuration errors. In step 504, the second code is stored in a staging area. In step 505, a configuration is calculated for a plurality of managed nodes. In step 506, the second code is sent to a local configuration manager on the managed node. In step 507, the managed node is configured based on a set of resources modeled in the second code.

Figure 6:
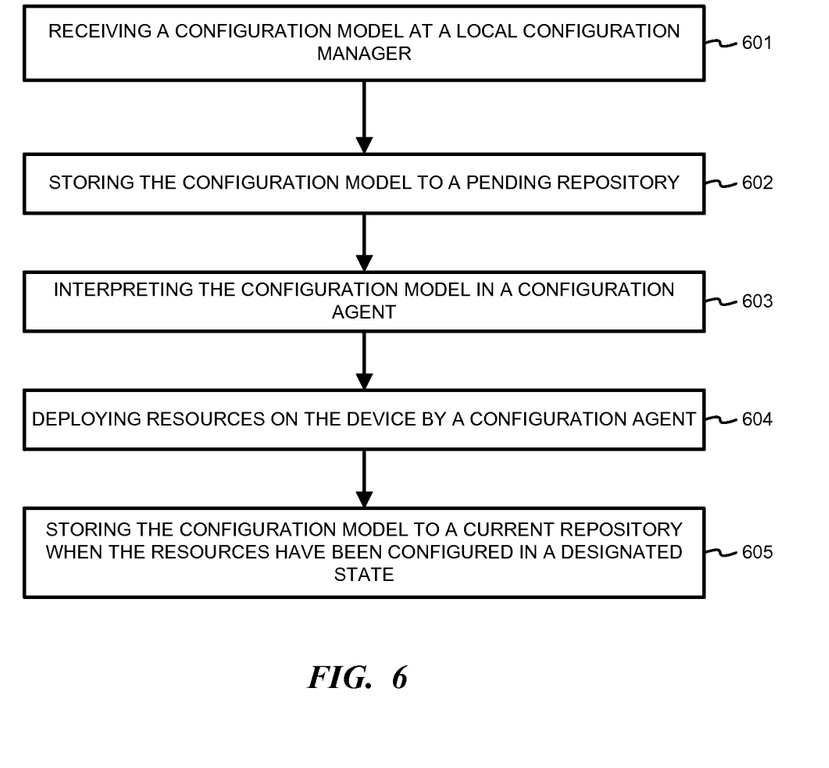
FIG. 6 is a flowchart illustrating a process or method for configuring a computing device.

FIG. 6 is a flowchart illustrating a process or method for configuring a computing device, which may include a processor and system memory, for example. The computing device is a node in a distributed computing network. In step 601, a configuration model is received at a local configuration manager on a node. The configuration model may be a managed object format (MOF) file, for example. In step 602, the configuration model is stored to a pending repository. In step 603, the configuration model is interpreted in a configuration agent. In step 604, resources are deployed on the device by a configuration agent. The resources may be deployed using a plurality of resource providers, each resource provider adapted to configure a specific resource. The resources are deployed in a state designated in the configuration model. In step 605, the configuration model is stored to a current repository when the resources have been configured in the designated state.

The resource configuration instructions may be sent from the configuration agent to a provider-provider. A designated resource provider instance may be created by the provider-provider to configure a resource designated by the configuration agent.

Figure 7:
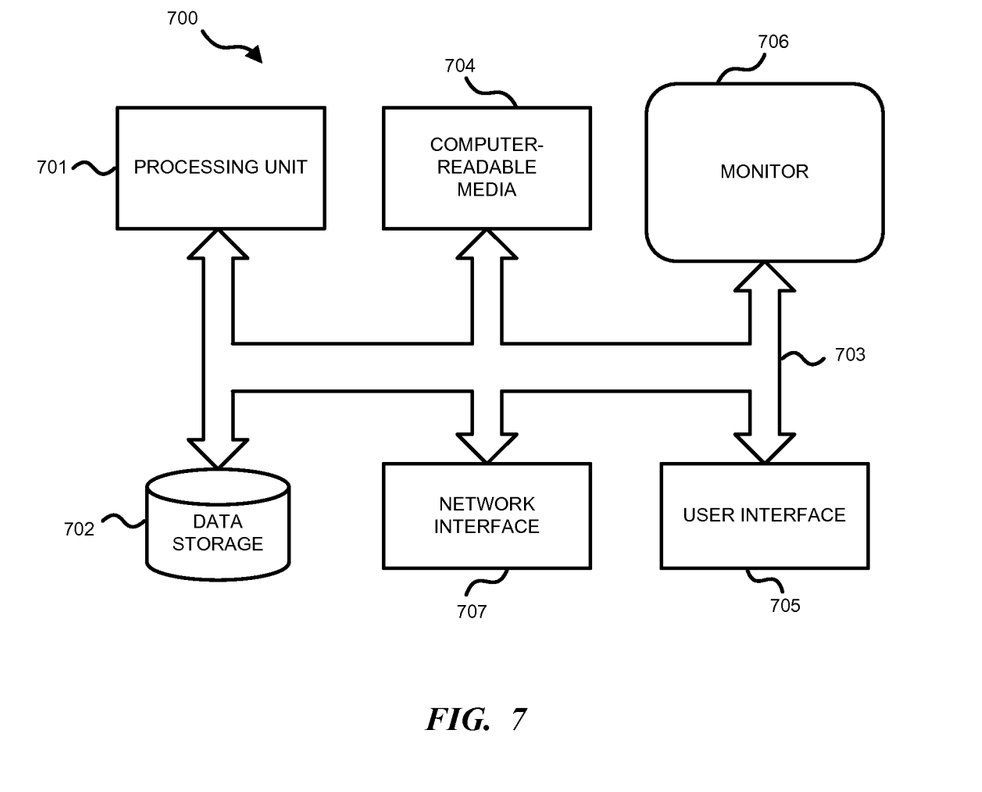
FIG. 7 illustrates an example of a suitable computing and networking environment for implementing embodiments of a desired state configuration system using declarative configuration elements.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 700. Components may include, but are not limited to, various hardware components, such as processing unit 701, data storage 702, such as a system memory, and system bus 703 that couples various system components including the data storage 702 to the processing unit 701. The system bus 703 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 700 typically includes a variety of computer-readable media 704. Computer-readable media 704 may be any available media that can be accessed by the computer 700 and includes both volatile and nonvolatile media, and removable and non-removable media, but excludes propagated signals. By way of example, and not limitation, computer-readable media 704 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 702 includes computer storage media in the form of volatile and/or nonvolatile memory such as read only memory (ROM) and random access memory (RAM). A basic input/output system (BIOS), containing the basic routines that help to transfer information between elements within computer 700, such as during start-up, is typically stored in ROM. RAM typically contains data and/or program modules that are immediately accessible to and/or presently being operated on by processing unit 701. By way of example, and not limitation, data storage 702 holds an operating system, application programs, and other program modules and program data.

Data storage 702 may also include other removable/non-removable, volatile/nonvolatile computer storage media. By way of example only, data storage 702 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 7, provide storage of computer-readable instructions, data structures, program modules and other data for the computer 700.

A user may enter commands and information through a user interface 705 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 701 through a user input interface 705 that is coupled to the system bus 703, but may be connected by other interface and bus structures, such as a parallel port, game port or a universal serial bus (USB). A monitor 706 or other type of display device is also connected to the system bus 703 via an interface, such as a video interface. The monitor 706 may also be integrated with a touch-screen panel or the like. Note that the monitor and/or touch screen panel can be physically coupled to a housing in which the computing device 700 is incorporated, such as in a tablet-type personal computer. In addition, computers such as the computing device 700 may also include other peripheral output devices such as speakers and printer, which may be connected through an output peripheral interface or the like.

The computer 700 may operate in a networked or cloud-computing environment using logical connections 707 to one or more remote devices, such as a remote computer. The remote computer may be a personal computer, a server, a router, a network PC, a peer device or other common network node, and typically includes many or all of the elements described above relative to the computer 700. The logical connections depicted in FIG. 7 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 700 may be connected to a public or private network through a network interface or adapter 707. In some embodiments, a modem or other means for establishing communications over the network. The modem, which may be internal or external, may be connected to the system bus 703 via the network interface 707 or other appropriate mechanism. A wireless networking component such as comprising an interface and antenna may be coupled through a suitable device such as an access point or peer computer to a network. In a networked environment, program modules depicted relative to the computer 700, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for incorporating an early-bound declarative language function into a late-bound imperative shell language, the method comprising:
    for a shell parser associated with a late-bound imperative shell language, introducing a new token to the shell parser to cause the shell parser to identify the new token as a dynamic keyword for the late-bound imperative shell language;
    defining the dynamic keyword as a configuration step that executes via the late-bound imperative shell language and creates a specified region for a programming artifact to be defined within the specified region, the programming artifact acting as an early-bound declarative language function;
    receiving source code written in the late-bound imperative shell language, the source code comprising at least:
        an imperative language source code construct of the late-bound imperative shell language including at least one imperative language programming function; and
        a declarative language source code construct comprising the early-bound declarative language function incorporated within the imperative language source code construct, which is defined by the programming artifact using the dynamic keyword;
    identifying, by the shell parser, the configuration step from the programming artifact using the dynamic keyword in the source code;
    based on the identified configuration step, compiling the imperative language source code construct and the declarative language source code construct of the source code to generate intermediate machine-readable code comprising a declarative configuration instructions model that configures a managed node;
    validating the intermediate machine-readable code prior to deployment of the declarative configuration instructions model on the managed node; and
    sending the intermediate machine-readable code to the managed node to execute instructions of the declarative configuration instructions model.

2. The method of claim 1, wherein the declarative language source code construct defines a set of resource definitions for a specific configuration context.

3. The method of claim 1, wherein the declarative language source code construct in the source code defines resources that are valid for a designated region of the source code.

4. The method of claim 1, wherein portions of the source code are written in a management automation language or a shell language.

5. The method of claim 1, wherein the machine-readable code is executable by an engine for a third language to define a desired state for one or more resources on the managed node.

6. The method of claim 1, wherein the machine-readable code is a managed object format (MOF) file.

7. The method of claim 1, further comprising:
    validating the machine-readable code against a set of rules to identify configuration errors.

8. The method of claim 1, further comprising:
    storing the machine-readable code in a staging area; and
    calculating a configuration for a plurality of managed nodes.

9. The method of claim 1, further comprising:
    sending the machine-readable code to a local configuration manager on the managed node.

10. The method of claim 9, further comprising:
    configuring the managed node based on a set of resources modeled in the machine-readable code.

11. The method of claim 1, wherein the dynamic keyword defines resources and properties that are available within a configuration region.

12. The method of claim 1, wherein the intermediate machine-readable code comprising the declarative configuration instructions model is staged to a staging area before deployment.

13. The method of claim 12, wherein validating the intermediate machine-readable code prior to deployment occurs while the intermediate machine-readable code is staged within the staging area.

14. The method of claim 12, wherein validating the intermediate machine-readable code comprises identifying memory size issues and/or security problems within the intermediate machine-readable code.

15. A memory storage device having stored thereon computer-executable instructions that are executable by a processor of a computing system to cause the computing system to incorporate an early-bound declarative language function into a late-bound imperative shell language by causing the computing system to at least perform the following:
for a shell parser associated with the late-bound imperative shell language, introduce a new token to the shell parser to cause the shell parser to identify the new token as a dynamic keyword for the late-bound imperative shell language;
define the dynamic keyword as a configuration step that executes via the late-bound imperative shell language and creates a specified region for a programming artifact to be defined within the specified region, the programming artifact acting as the early-bound declarative language function;
receive source code written in the late-bound imperative shell language, the source code comprising at least:
an imperative language source code construct of the late bound imperative shell language including at least one imperative language programming function; and
a declarative language source code construct comprising the early-bound declarative language function incorporated within the imperative language source code construct, which is defined by the programming artifact using the dynamic keyword;
identify, by the shell parser, the configuration step from the programming artifact using the dynamic keyword in the source code;
based on the identified configuration step, compile the imperative language source code construct and the declarative language source code construct of the source code to generate intermediate machine-readable code comprising a declarative configuration instructions model that configures a managed node;
validate the intermediate machine-readable code prior to deployment of the declarative configuration instructions model on the managed node; and
send the intermediate machine-readable code to the managed node to execute instructions of the declarative configuration instructions model.

16. A system for incorporating an early-bound declarative language function into a late-bound imperative shell language, the system comprising:
a processor; and
memory coupled to the processor, the memory having program instructions stored thereon that, upon execution by the processor, cause the system to:
for a shell parser associated with a late-bound imperative shell language, introduce a new token to the shell parser to cause the shell parser to identify the new token as a dynamic keyword for the late-bound imperative shell language;
define the dynamic keyword as a configuration step that executes via the late-bound imperative shell language and creates a specified region for a programming artifact to be defined within the specified region, the programming artifact acting as an early-bound declarative language function;
receive source code written in the late-bound imperative shell language, the source code comprising at least:
an imperative language source code construct of the late bound imperative shell language including at least one imperative language programming function; and
a declarative language source code construct comprising the early-bound declarative language functions incorporated within the imperative language source code construct, which is defined by the programming artifact using the dynamic keyword;
identify, by the shell parser, the configuration step from the programming artifact using the dynamic keyword in the source code;
based on the identified configuration step, compile the imperative language source code construct and the declarative language source code construct of the source code to generate intermediate machine-readable code comprising a declarative configuration instructions model that configures a managed node;
validate the intermediate machine-readable code prior to deployment of the declarative configuration instructions mode on the managed node; and
send the intermediate machine-readable code to the managed node to execute instructions of the declarative configuration instructions model.

17. The system of claim 16, wherein the declarative language source code construct defines a set of resource definitions for a specific configuration context.

18. The system of claim 16, wherein the declarative language source code construct in the source code defines resources that are valid for a designated region of the source code.

19. The system of claim 16, wherein the machine-readable code defines a desired state for one or more resources on the managed node.

20. The system of claim 16, wherein defining the dynamic keyword is performed by defining a new DynamicKeyword class, which defines a list of properties that are available for the dynamic keyword.

* * * * *